US011449329B2

(12) United States Patent
Nakahara et al.

(10) Patent No.: US 11,449,329 B2
(45) Date of Patent: Sep. 20, 2022

(54) VEHICLE CONTROL DEVICE AND PROGRAM UPDATE SYSTEM

(71) Applicant: Hitachi Automotive Systems, Ltd., Hitachinaka (JP)

(72) Inventors: Fumiharu Nakahara, Hitachinaka (JP); Kenichi Kurosawa, Hitachinaka (JP); Yusuke Abe, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 28 days.

(21) Appl. No.: 16/770,149

(22) PCT Filed: Feb. 1, 2019

(86) PCT No.: PCT/JP2019/003566
§ 371 (c)(1),
(2) Date: Jun. 5, 2020

(87) PCT Pub. No.: WO2019/159715
PCT Pub. Date: Aug. 22, 2019

(65) Prior Publication Data
US 2021/0173634 A1   Jun. 10, 2021

(30) Foreign Application Priority Data
Feb. 16, 2018 (JP) .............................. JP2018-025639

(51) Int. Cl.
*G06F 9/44* (2018.01)
*G06F 8/658* (2018.01)
(Continued)

(52) U.S. Cl.
CPC ............. *G06F 8/658* (2018.02); *B60W 50/00* (2013.01); *G06F 3/0604* (2013.01);
(Continued)

(58) Field of Classification Search
CPC .... G06F 3/0604; G06F 3/0659; G06F 3/0673; G06F 8/654; G06F 8/658; G07C 5/0808; B60W 50/00; B60W 2050/0083
(Continued)

(56) References Cited
U.S. PATENT DOCUMENTS 6,640,334 B1 * 10/2003 Rasmussen ............... G06F 8/65
717/169
7,623,853 B2 * 11/2009 Vikse ................ H04M 3/42178
455/410
(Continued)

FOREIGN PATENT DOCUMENTS

JP    2005-215841 A    8/2005
JP    2006-113656 A    4/2006
(Continued)

OTHER PUBLICATIONS

Bogdan et al., "Delta Flashing of an ECU in the Automotive Industry", 2016, IEEE, pp. 503-508. (Year: 2016).*
(Continued)

*Primary Examiner* — Ted T. Vo
(74) *Attorney, Agent, or Firm* — Foley & Lardner LLP

(57) ABSTRACT

The present invention realizes control program update even when the difference data is large. In the present invention, when updating the program, by controlling the amount of data to be received according to the capacity of the area of the vehicle control device storing the difference data, the vehicle control device sequentially performs restoration and update from the received partial data even if not all the difference data are stored.

6 Claims, 15 Drawing Sheets

(51) Int. Cl.
    *G06F 8/654*    (2018.01)
    *B60W 50/00*   (2006.01)
    *G06F 3/06*    (2006.01)
    *G07C 5/08*    (2006.01)

(52) U.S. Cl.
    CPC .......... *G06F 3/0659* (2013.01); *G06F 3/0673* (2013.01); *G06F 8/654* (2018.02); *G07C 5/0808* (2013.01); *B60W 2050/0083* (2013.01)

(58) Field of Classification Search
    USPC ................................................ 717/168–178
    See application file for complete search history.

(56) References Cited

U.S. PATENT DOCUMENTS

| | | | |
|---|---|---|---|
| 10,761,528 B2 * | 9/2020 | Matsumoto | ........... B60R 25/102 |
| 2006/0090159 A1 | 4/2006 | Kondo | |
| 2007/0294685 A1 | 12/2007 | Oh | |
| 2009/0113412 A1 * | 4/2009 | Shribman | ............... G06F 16/10 |
| | | | 717/170 |
| 2020/0183674 A1 | 6/2020 | Tateishi et al. | |

FOREIGN PATENT DOCUMENTS

| | | |
|---|---|---|
| JP | 2007-128204 A | 5/2007 |
| JP | 2008-310596 A | 12/2008 |
| JP | 2012-069131 A | 4/2012 |
| JP | 2012-190075 A | 10/2012 |
| JP | 2012-226619 A | 11/2012 |
| JP | 2016-118879 A | 6/2016 |
| JP | 2018-020718 A | 2/2018 |

OTHER PUBLICATIONS

Onuma et al., "Improved Software Updating for Automotive ECUs", 2016, IEEE, pp. 319-324. (Year: 2016).*

Teraoka et al., "Incremental Update Method for Resource-Constrained In-vehicle ECUs", 2016, IEEE, 2 pages. (Year: 2016).*

Office Action issued in corresponding Japanese Patent Application No. 2020-500391 dated May 18, 2021.

International Search Report with English translation and Written Opinion issued in corresponding application No. PCT/JP2019/003566 dated May 14, 2019.

* cited by examiner

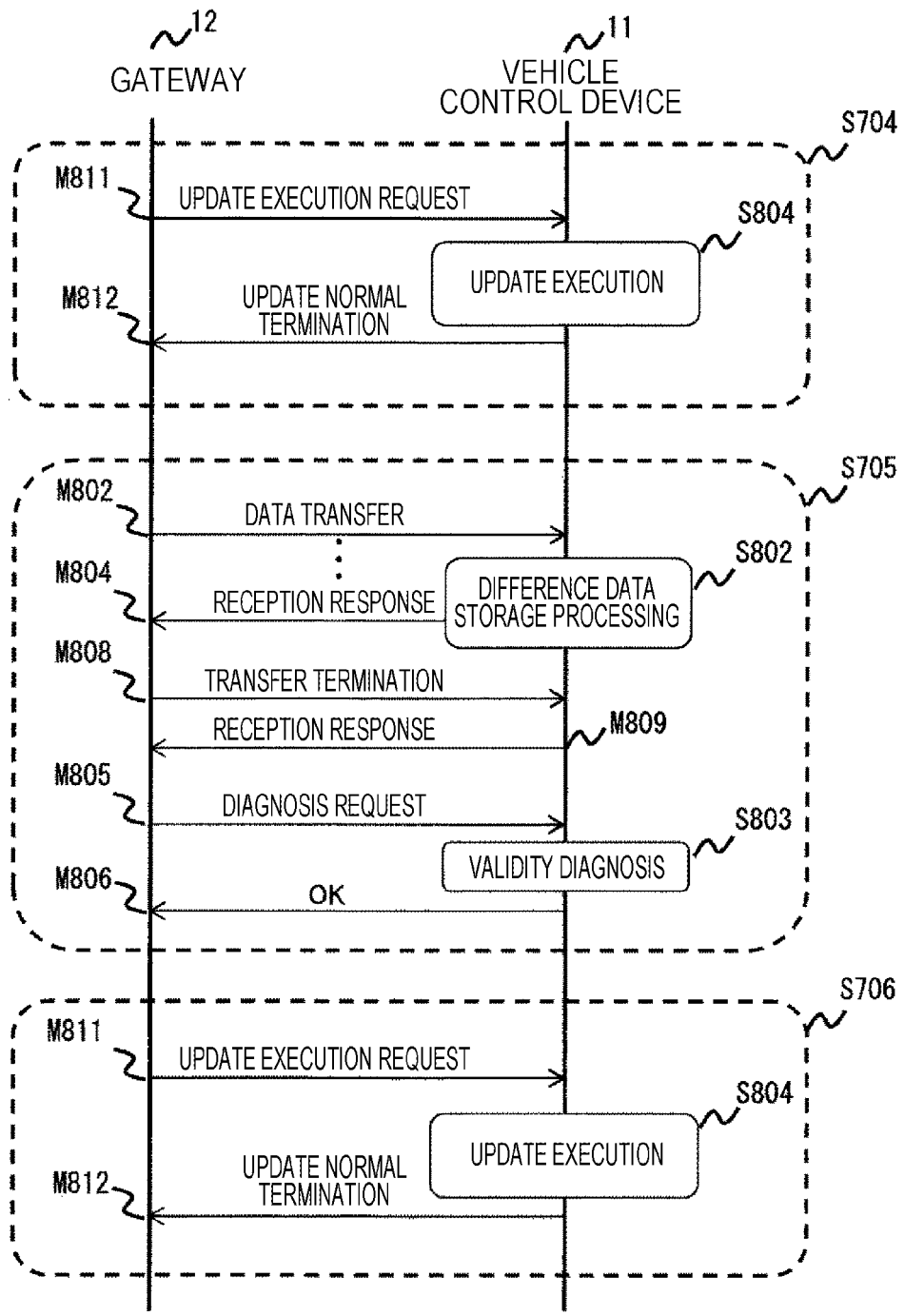

VEHICLE CONTROL DEVICE AND PROGRAM UPDATE SYSTEM

TECHNICAL FIELD

The present invention relates to a vehicle control device and a program update system.

BACKGROUND ART

A vehicle control device includes an arithmetic unit (e.g., microcomputer) that executes a control program implemented with an operation to control a vehicle, and a rewritable nonvolatile memory such as a flash read only memory (ROM) that stores the control program executed by the arithmetic unit.

In reprogramming of such a vehicle control device, conventionally, a personal computer (PC) or an in-vehicle write device as a writing tool and an in-vehicle electric control unit (ECU) are connected with each other via a low-speed controller area network (CAN), and an entire new program is written to the flash ROM of the ECU while being divided and transferred. Therefore, there is a problem that it takes time for writing.

On the other hand, an approach of reprogramming by a difference has been proposed for the purpose of shortening the update time. In PTL 1 and PTL 2, a difference between programs before and after update is downloaded to a reception device, and stored in a memory together with the program before update, and the program of the reception device is updated using the information.

CITATION LIST

Patent Literature

PTL 1: JP 2012-69131 A
PTL 2: JP 2012-190075 A

SUMMARY OF INVENTION

Technical Problem

In the above-described patent literature, it is necessary to download all the differences between the programs before and after update and to store them in the memory of the reception device. However, a vehicle control device generally has a small memory capacity, and it is difficult to sufficiently ensure a memory area for program update. If it is designed in consideration of the memory necessary and sufficient for downloading all the differences, the capacity becomes large and the component cost increases. In addition, it is difficult to know the size of the difference in future software update at the software design stage, and it is difficult to find an appropriate memory capacity.

Therefore, the present invention realizes program update even when the difference data is large.

Solution to Problem

A vehicle control device according to the present invention includes: a first memory unit in which a rewritable program is stored; a second memory unit that stores difference data between the program and a new program; a reception unit that receives the difference data divided for each write block unit length of the second memory unit, an address of a write destination of the new program, and data including a size of the difference data; a determination unit that determines a size of the difference data having been received; a write unit that writes the difference data having been received to the address of the second memory unit; a difference restoration unit that restores the new program from the difference data stored in the second memory unit and the program; and a rewrite unit that rewrites the program in the first memory unit to the new program having been restored.

Advantageous Effects of Invention

According to the above-described means, program update is realized even when the difference data is large.

BRIEF DESCRIPTION OF DRAWINGS

FIG. 8B is a sequence diagram of the difference data storage processing.

DESCRIPTION OF EMBODIMENTS

First Embodiment

A program update system according to an embodiment of the present invention will be described below with reference to the drawings.

Figure 1:
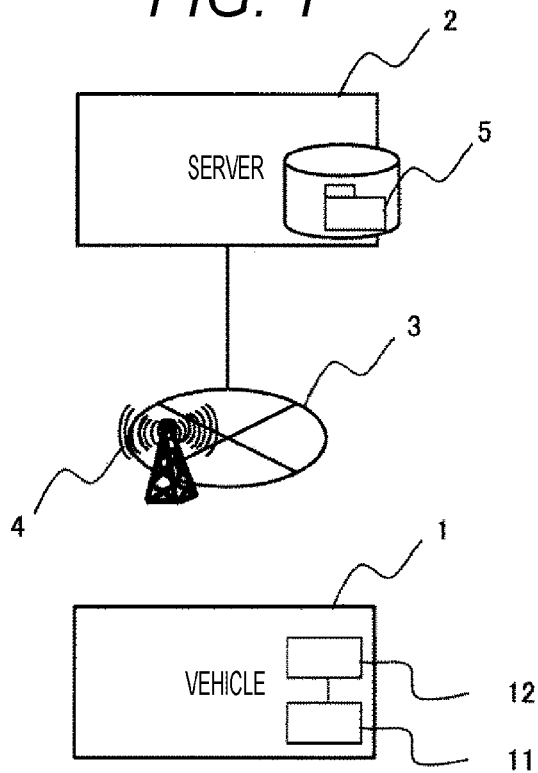
FIG. 1 is a configuration diagram of a program update system including a vehicle control device according to an embodiment of the present invention.

FIG. 1 is a configuration diagram of a program update system according to an embodiment of the present invention. This program update system includes a vehicle 1, a server 2, an Internet line 3, and a wireless base station 4. The vehicle 1 is connected with the server 2 by wireless communication via the Internet line 3 and the wireless base station 4 and communicates with each other. The wireless communication is realized by using, for example, a mobile phone network by a public line such as 3G/LTE or a line such as WiFi. The server 2 distributes to the vehicle 1 an update package 5 necessary for update of a control program of a vehicle control device 11 that the vehicle 1 has. The vehicle control device 11 of the vehicle 1 updates the control program by using the update package 5.

Figure 2:
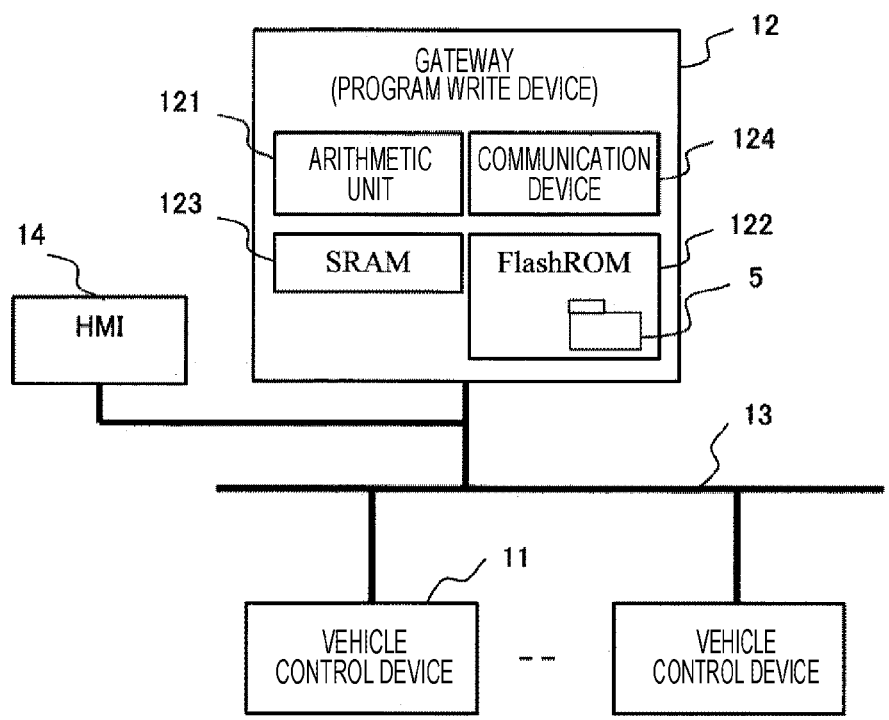
FIG. 2 is a configuration diagram of an in-vehicle network system that a vehicle has.

FIG. 2 is a configuration diagram of an in-vehicle network system included in the vehicle 1. The vehicle control device 11 is a device that executes a control program that controls the operation of the vehicle 1, and is connected with a gateway 12 (program write device) via an in-vehicle network 13 (e.g., car area network (CAN)). The vehicle control device 11 can communicate with another vehicle control device via the gateway 12.

The gateway 12 also has a role as a program write device that controls update of the control program of the vehicle control device 11. The gateway 12 receives the update package 5 from the server 2, and transmits to the vehicle control device 11 an update instruction (reprogramming instruction) of the control program, difference data for update, and the control program itself. A program write device may be provided separately from the gateway 12.

The gateway 12 has an arithmetic unit 121, a flash read only memory (ROM) 122, a static random access memory (SRAM) 123, and a communication device 124 including a CAN transceiver and a wireless communication module. By executing a program stored in the flash ROM 122, the arithmetic unit 121 performs communication with the vehicle control device 11 on the in-vehicle network 13 and the server 2. When updating the control program of the vehicle control device 11, the gateway 12 receives the update package 5 from the server 2, temporarily stores it in the flash ROM 122, and updates the control program of the vehicle control device 11 using the temporarily stored update package 5.

A human-machine interface (HMI) 14 includes, for example, a liquid crystal display device for various displays embedded in the center of a dashboard of the vehicle 1, operation switches arranged in the vicinity thereof, and an in-vehicle speaker. The HMI 14 performs various displays for the occupant of the vehicle 1 and processes various input operations. The HMI 14 performs display and operation input related to update of the control program of the vehicle control device 11.

Figure 3:
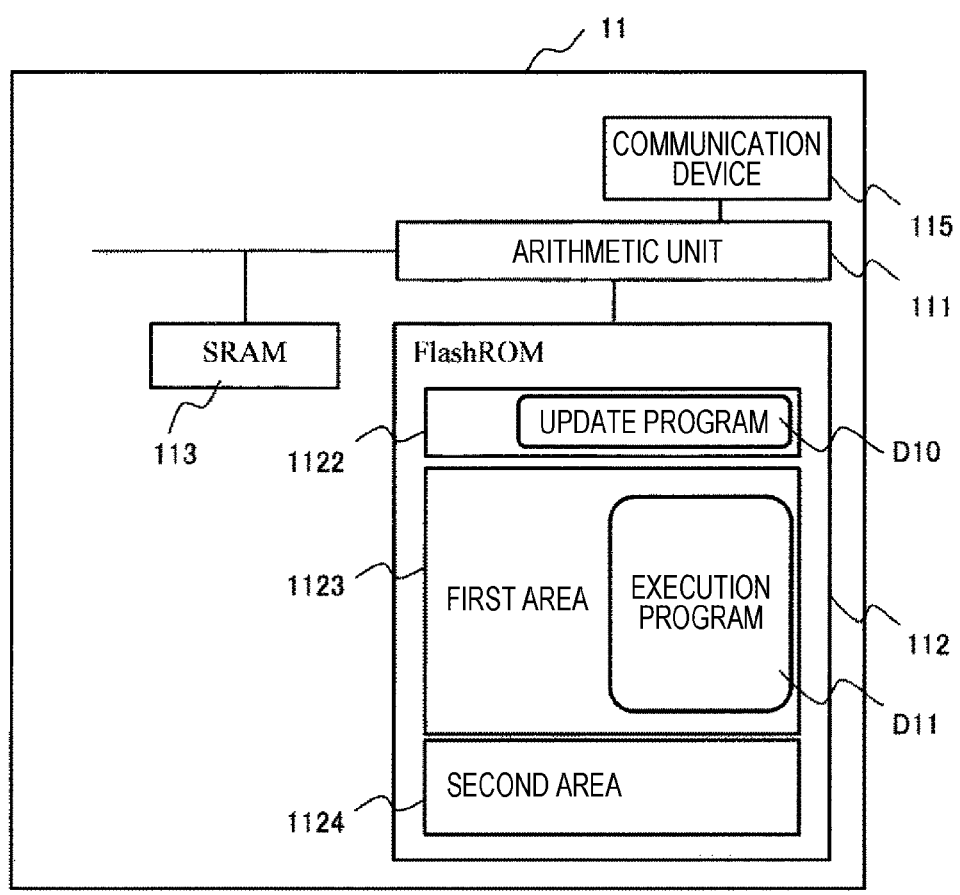
FIG. 3 is a functional block diagram of the vehicle control device.

FIG. 3 is a configuration diagram of the vehicle control device 11. The vehicle control device 11 includes an arithmetic unit 111, a flash ROM 112, an SRAM 113, and a communication device 114 (e.g., CAN transceiver).

The arithmetic unit 111 is an arithmetic device such as a microcomputer that executes a control program stored in the flash ROM 112. In the following, for convenience of description, although each program may be described as an operation subject, the arithmetic unit 111 actually executes these programs.

The flash ROM 112 is a rewritable nonvolatile memory and has a boot block 1122, a first area 1123 as a first storage area, and a second area 1124 as a second storage area. The configuration thereof will be described below with reference to FIG. 4.

Figure 4:
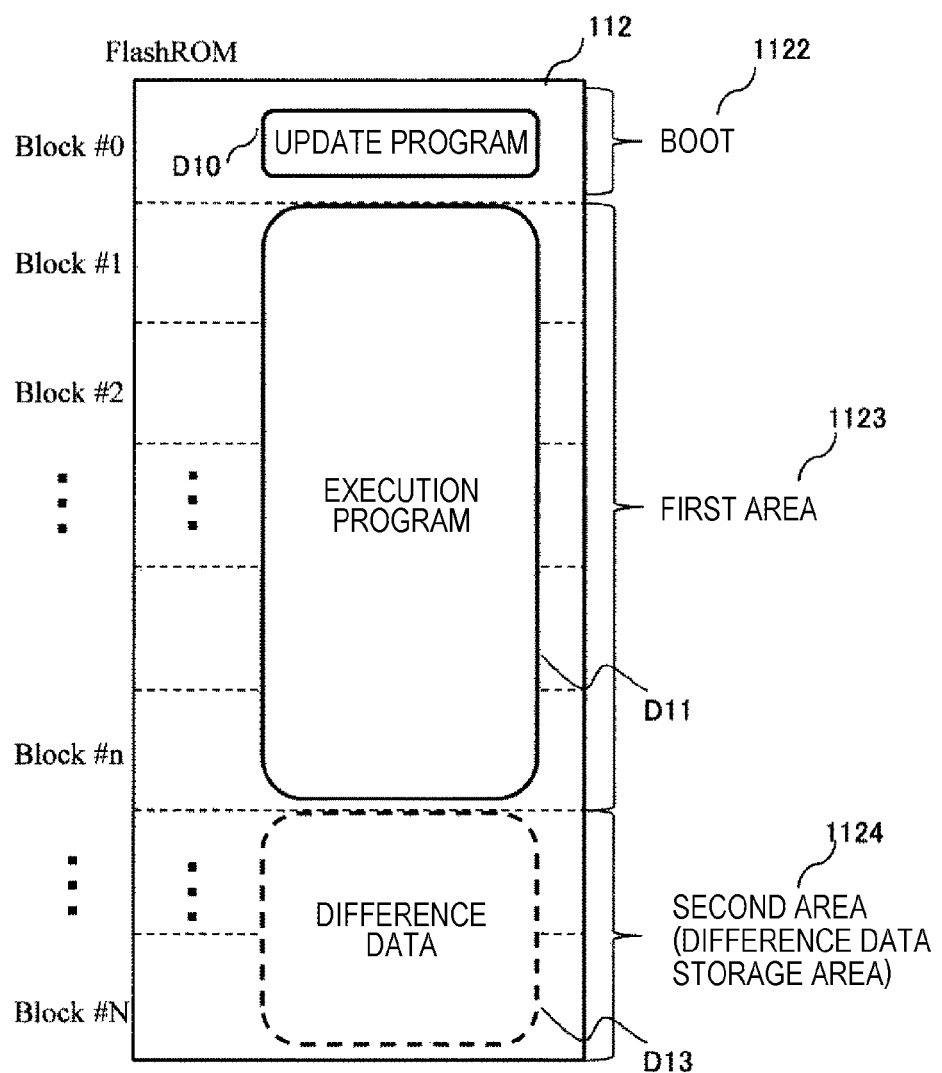
FIG. 4 is a configuration example of a flash ROM of the vehicle control device.

FIG. 4 is a diagram illustrating an internal configuration of the flash ROM 112.

The flash ROM 112 is composed of a plurality of blocks Block #0 to Block #N, and has the first area 1123 in which an execution program D11 is stored and the second area 1124 used as an area in which difference data D13 is stored. Here, the block indicates an erasing/rewriting unit of the flash ROM. The difference data D13 indicates difference data generated from the execution program D13 and a new execution program. The difference generation will be described later. In the present embodiment, the first area 1123 and the second area 1124 are composed of a plurality of blocks, but may be as a single block. The head block Block #0 is the boot block 1122, and includes an update program D10 which performs communication with the gateway 12, stores the difference data D13, and updates the execution program D11. Next, the update program D10 will be described with reference to FIG. 5.

Figure 5:
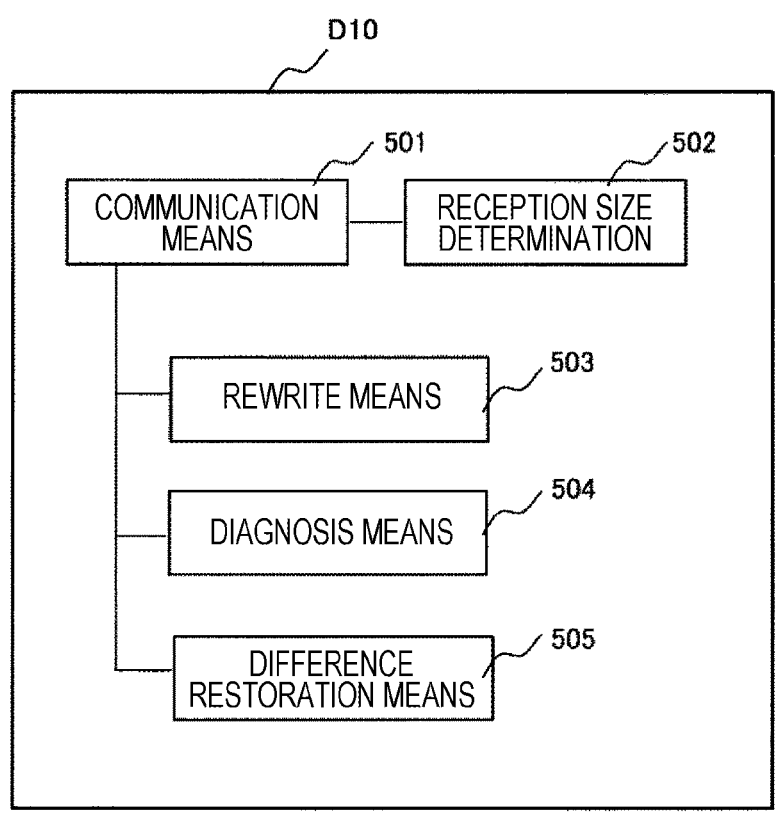
FIG. 5 is a functional block diagram of an update program.

FIG. 5 is a diagram illustrating the functional configuration of the update program D10. The update program D10 has functions of a communication means 501, a rewrite means 503, a diagnosis means 504, a difference restoration means 505, and a reception size determination 502. The communication means 501 communicates with the gateway 12. The rewrite means 503 erases and rewrites a specified area of the flash ROM 112. The diagnosis means 504 diagnoses whether the received difference data has been correctly written. The difference restoration means 505 has a function of restoring a new program by using the difference data D13 stored in the second area 1124 and the execution program D11 in the first area 1123. The reception size determination 502 determines a data length of the difference data received by the communication means 501. The software update according to the present embodiment using these functions will be described below.

Figure 6:
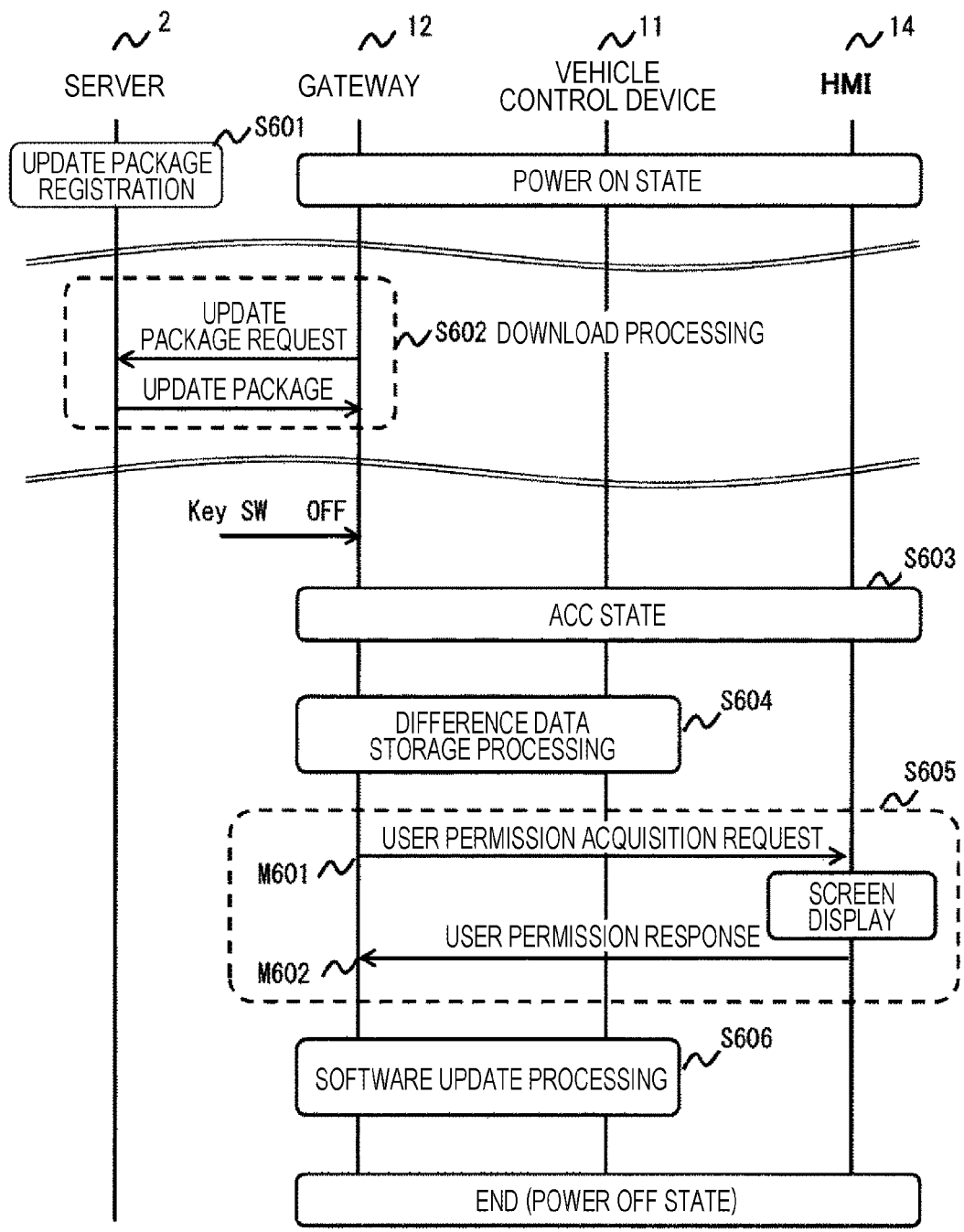
FIG. 6 is a reprogramming sequence diagram of the vehicle control device according to an embodiment of the present invention.

FIG. 6 is a sequence example illustrating a flow of the entire update processing. When the control software of the vehicle control device 11 is corrected, the update package 5 is registered in the server 2 as preparation for software update (S601). At the timing of starting the ignition of the vehicle or the like, the gateway 12 downloads the update package 5 from the server 2 via the communication device 124 and holds it in the flash ROM 122 of the gateway 12 (S602). Subsequently, when the power switch of the vehicle is turned off and the vehicle transitions from a power on state to an ACC state S603, the difference data D13 is received from the gateway 12 to the ECU of the update target, and stored in the second area 1124 (S604). When the storage of the difference data D13 is normally completed, the gateway 12 transmits a user permission request M601 to the HMI 14, and displays a screen for confirming whether to permit update of the execution program D11 (S605). If the user permits, the HMI responds a user permission M602 and performs program update processing of the target vehicle control device 11 (S606). When the update of the execution program D11 terminates normally, the power of the vehicle is turned off.

In addition to the ACC state, the timing of executing difference data storage processing (S604) and software update processing (S606) may be immediately after completion of download processing S602 of update data, at a predetermined time, or the like.

Figure 7:
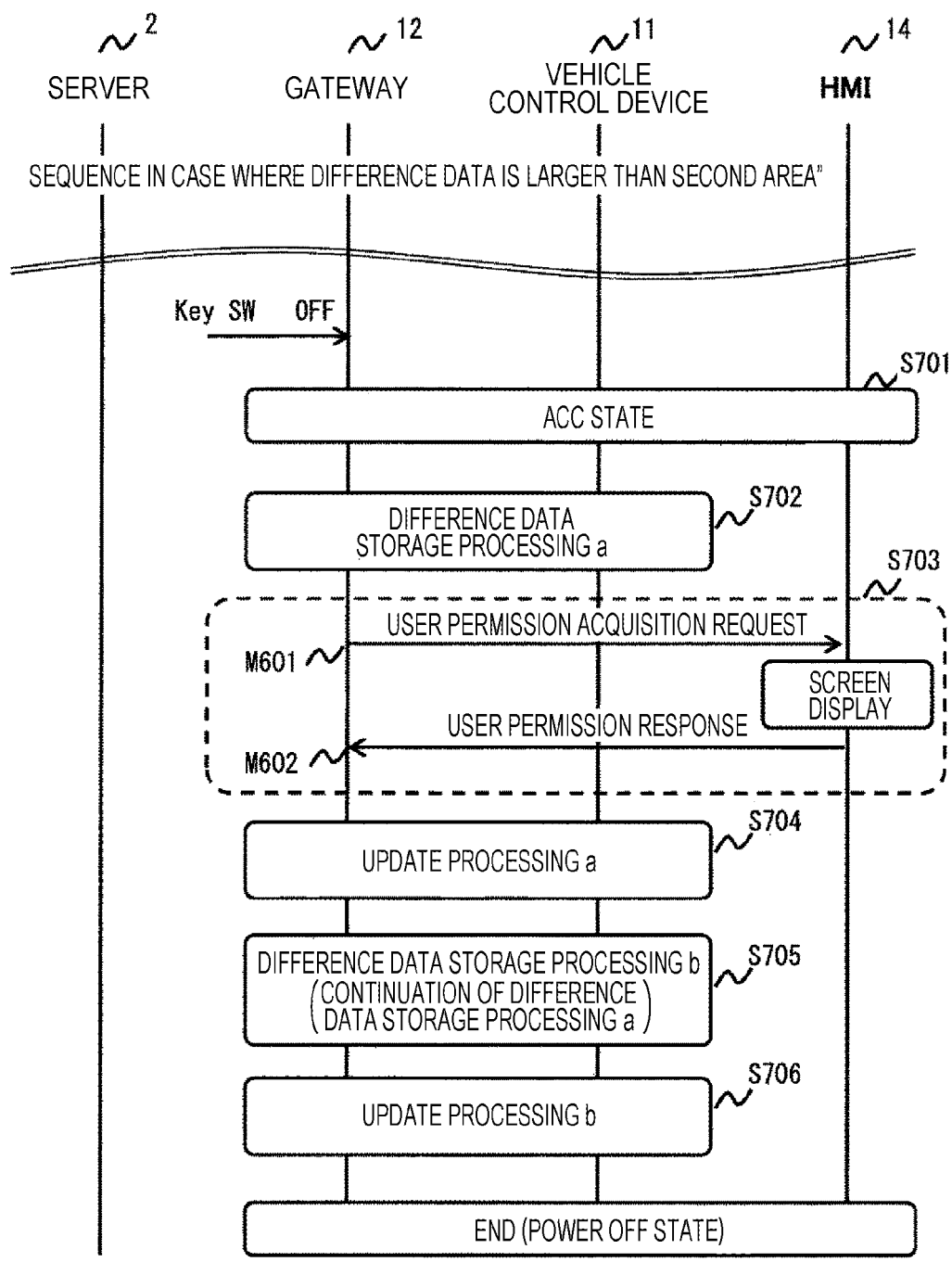
FIG. 7 is a reprogramming sequence diagram of the vehicle control device when difference data is larger than a second area.

FIG. 7 illustrates a sequence example illustrating the flow of the entire update processing when the data size of the difference data D13 is larger than the storage size of the second area 1124 of the vehicle control device 11.

Since the flow up to the registration processing of the update data D13 into the server 2 is the same as that in FIG. 6, the sequence thereafter will be described.

For example, when the power switch of the vehicle is turned off and the vehicle transitions from a power on state to an ACC state S701, the difference data D13 is received from the gateway 12 to the ECU of the update target, and stored in the second area 1124 (S702). Here, if the data size of the difference data D13 is larger than the storage size of the second area 1124 of the vehicle control device 11 and the vehicle control device 11 determines that not all the difference data D13 can be stored in the second area 1124, a standby instruction is transmitted to the gateway 12 to suspend the data transfer.

Next, a screen for confirming whether to permit update of the execution program D11 is displayed (S703). When the user permits it, program update processing to the target vehicle control device 11 is performed (S704). In step S704, using the difference data D13 successfully stored in the second area 1124 in difference data storage processing a S702, program update is carried out for only a part of the execution program D11 (referred to as "update processing a"). When the update of the execution program terminates, the gateway 12 starts transmission of remaining difference data D13'. The vehicle control device 11 stores the difference data D13' in the second area 1124 (S705). When the storage of the difference data D13' is normally completed, program update processing of the execution program D11 is performed using the data (S706). In step S706, the program update is performed from the continued area of program update processing a S704 (referred to as "update processing b").

A more detailed procedure of the difference data storage processing and the update processing (S702 to S706) will be described below.

Figure 8A:
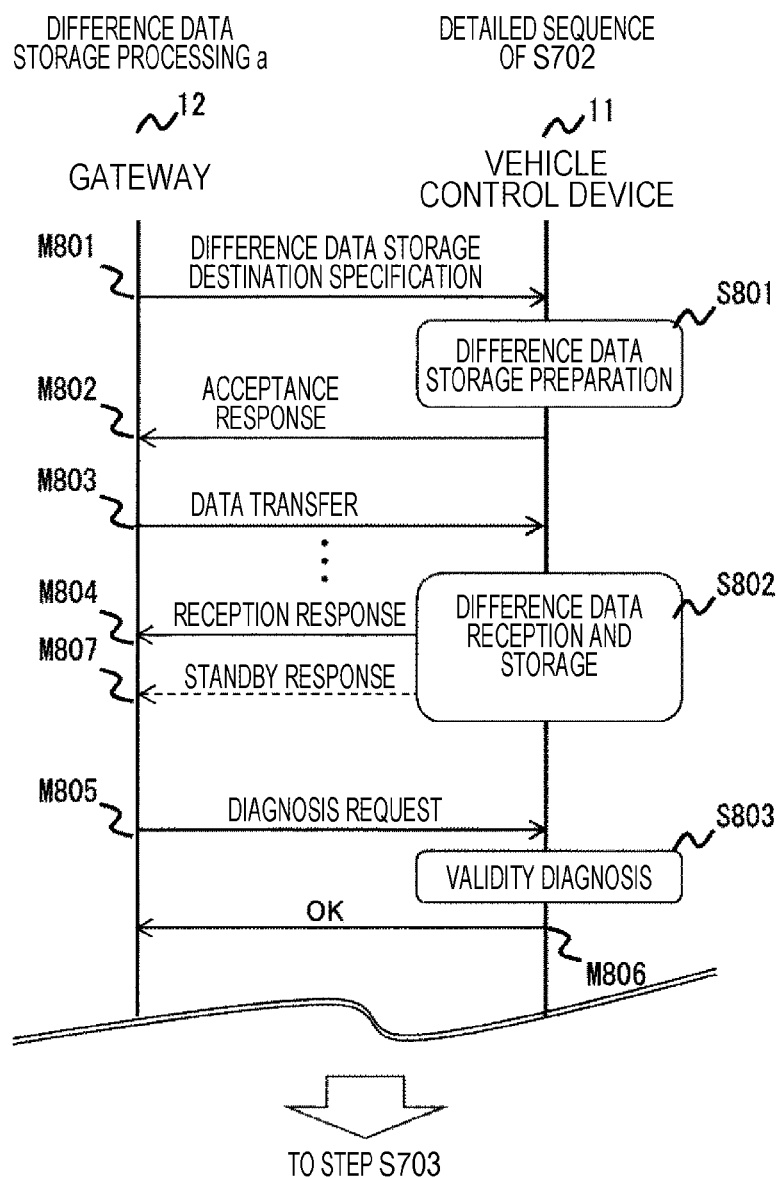
FIG. 8A is a sequence diagram of difference data storage processing.

FIG. 8A is a sequence diagram illustrating the flow of the difference data storage processing executed between the gateway 12 and the vehicle control device 11 in the difference data storage processing a S702. First, the gateway 12 transmits a difference data storage destination specification command to the vehicle control device 11 (M801). The difference data storage destination specification command includes information such as a data format, a transmission data size, and a write destination address indicating a write destination of the transmitted data, for example.

Here, the second area 1124 is specified as a write destination of the difference data. Upon receiving the difference data storage destination specification command M801, the vehicle control device 11 prepares for storing the difference data in step S801 and returns an acceptance response to the gateway 12 (M802). This acceptance response includes information such as a data size that the vehicle control device 11 can receive at a time.

Next, the gateway 12 reads the difference data D13 from the update package 5, divides it into a data size that the vehicle control device 11 can receive at a time, and transfers it to the vehicle control device 11 (M803). Upon receiving the difference data transmitted from the gateway 12 in step S802, the vehicle control device 11 sequentially stores the difference data to the write destination specified by the difference data storage destination specification command (M801).

Here, it is stored in the second area 1124. The gateway 12 and the vehicle control device 11 repeat the processing of M803 and S802 until completing the transfer of all the difference data. Here, when determining that the data size to receive is larger than the storage size of the second area 1124, the vehicle control device 11 transmits a standby response to the gateway 12 (M807). Upon receiving the standby response (M807), the gateway 12 stops the data transfer, stores the start position of the untransmitted data, and then, transmits a diagnosis request command to the vehicle control device 11 (M805). This diagnosis request includes information such as a diagnosis index, a data size for performing a diagnosis, and a head address for performing a diagnosis, for example. Upon receiving the diagnosis request command in step S803, the vehicle control device 11 performs data validity checking of the area corresponding to a specified size from a specified head address, and confirms that the difference data has been normally stored in the second area 1124. The vehicle control device 11 responds the diagnosis result to the gateway 12 (M806).

Figure 9:
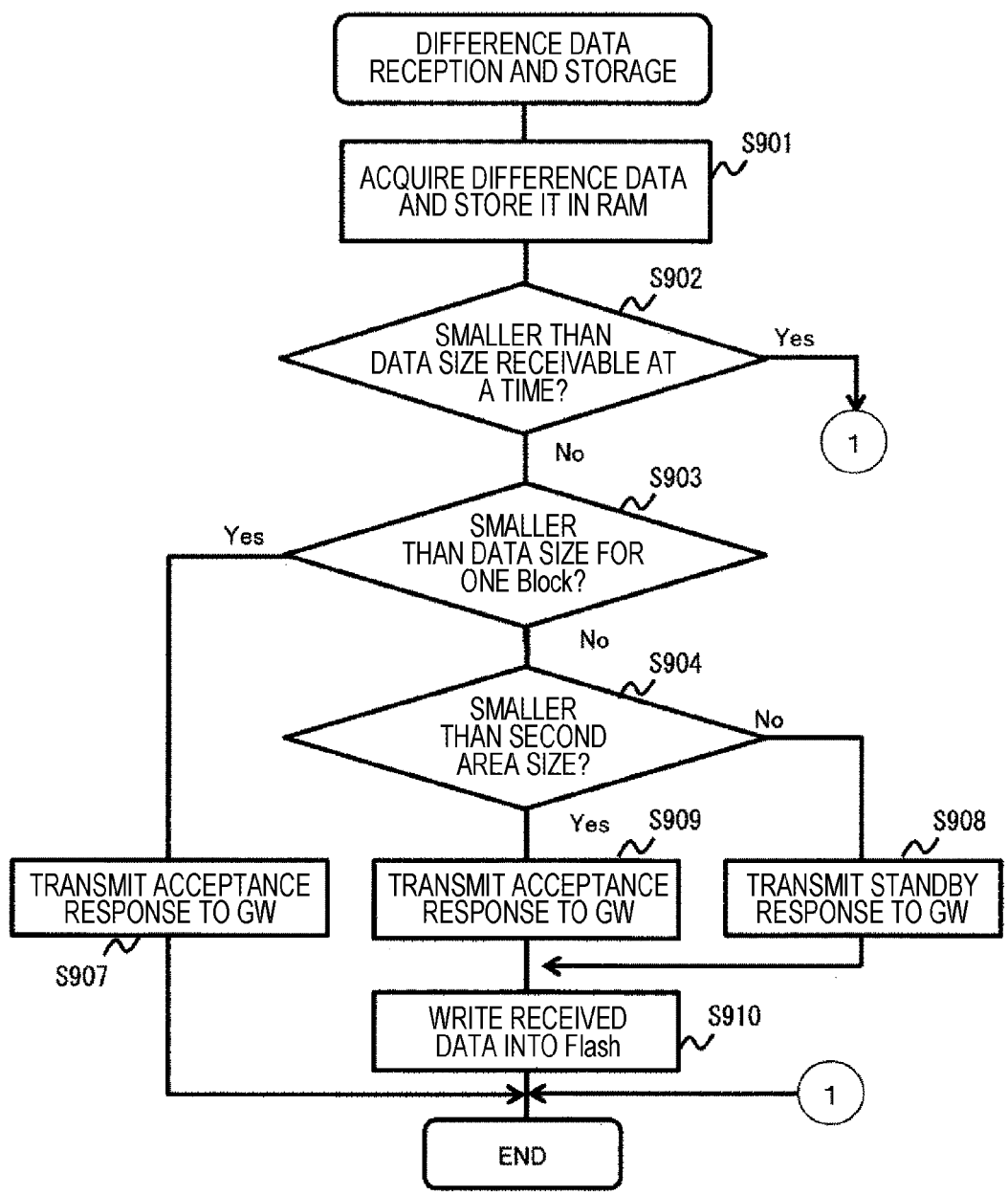
FIG. 9 is a flowchart of the difference data storage processing.

The operation of the difference data reception and storage processing S802 will now be described with reference to FIGS. 5 and 9. The difference data reception and storage processing S802 is executed by the update program D10 when the vehicle control device 11 receives the difference data from the gateway 12.

First, the difference data received by the communication means 501 is stored in the RAM 113 (S901), and the reception size determination 502 determines the size of the received difference data (S902 to S904). In step S902, it is determined whether a data size receivable at a time has been received. In step S903, it is determined whether one block of data has been received. Finally, in step S904, it is determined whether the received data size is smaller than the second area size. The update program D10 writes the data stored in the RAM into the flash ROM (S910) by the rewrite means 503 every time one block of received data is accumulated, and transmits an acceptance response for receiving the next received data (S909). Here, if it is determined in step S904 that the received data size is equal to or greater than the second area size, the update program D10 transmits a standby response to the gateway 12 and notifies it to suspend the transmission of the difference data (S908).

Figure 10:
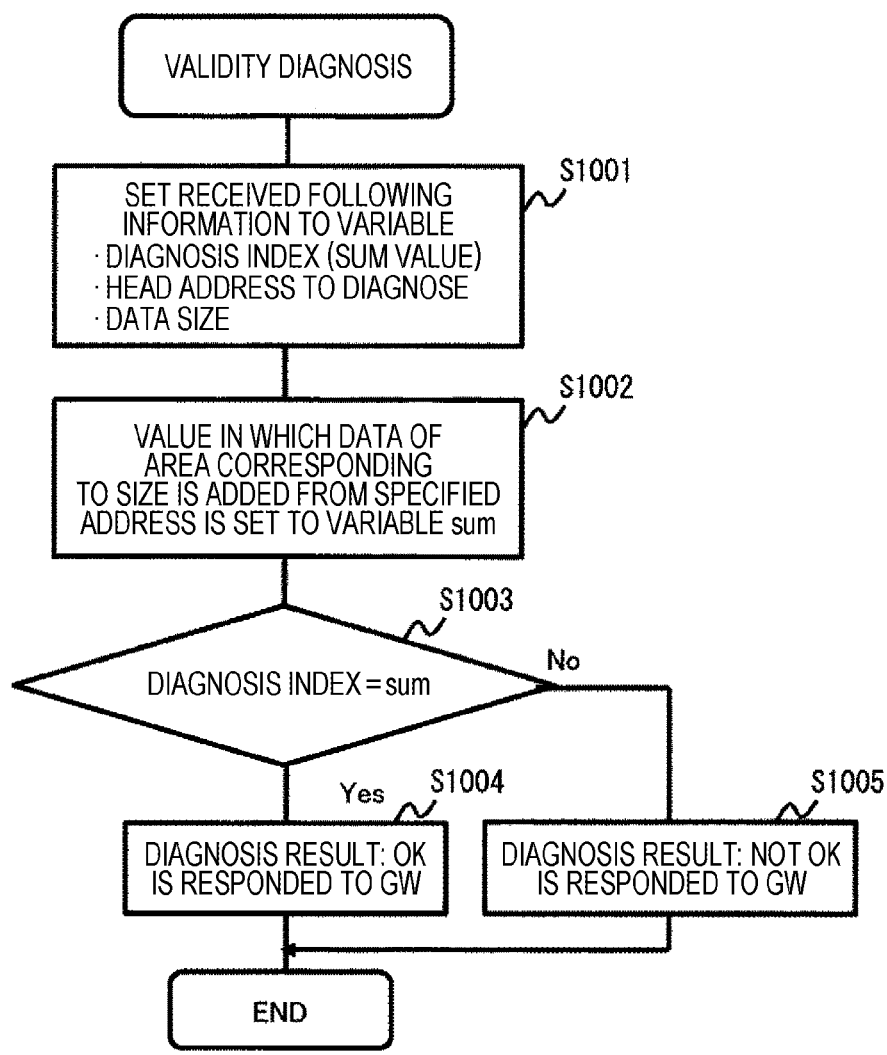
FIG. 10 is a flowchart of validity diagnosis processing.

Next, the operation of validity diagnosis S803 will be described with reference to FIGS. 5 and 10. The validity diagnosis S803 is executed by the update program D10 when the vehicle control device 11 receives a diagnosis request M806 from the gateway 12. In the present embodiment, an example of error diagnosis by sum check will be given.

First, in step S1001, information associated with the diagnosis request M806 received by the communication means 501 is stored in a variable. Here, the sum value of the difference data transmitted by the gateway 12, the head address information of the area in which the data to be diagnosed is stored, and the data size to be diagnosed are each set as a variable. Next, in step S1002, a value obtained by adding the data (difference data in the second area 1124) of the area from the head address to the data size is set to a variable sum. Next, in step S1003, a determination is made as to whether the sum value of the difference data obtained from the diagnosis request M806 matches the variable sum. If Yes, Diagnosis Result: Normal is transmitted to the gateway 12 in step S1004, and if no, Diagnosis Result: Abnormal is responded.

FIG. 8A explains the series of sequence of the difference data storage processing performed in the difference data storage processing a S702. However, step S703 is executed next if it is confirmed in the validity diagnosis S803 that the difference data has been normally stored in the second area 1124. Step S703 is processing of confirming permission from the user to update the execution program D11. This will be described below with reference to FIGS. 7 and 11.

Figure 11:
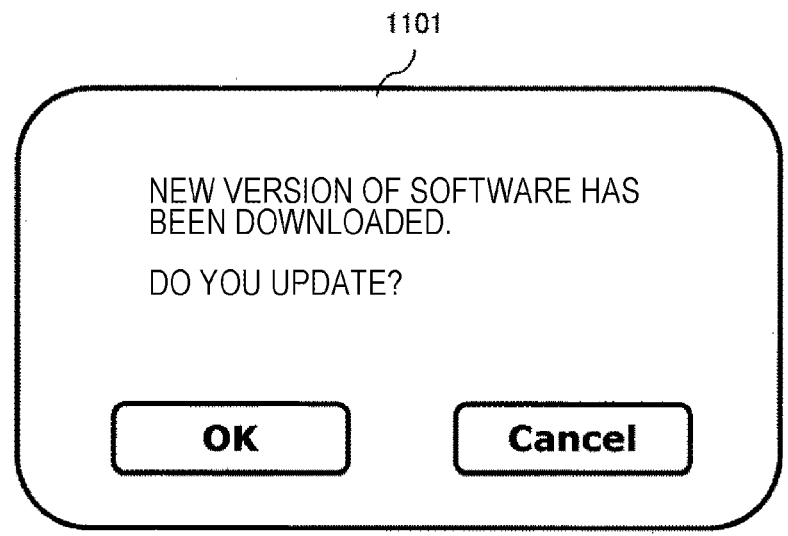
FIG. 11 is an example of a user permission screen.

The gateway 12 performs a user permission acquisition request to the HMI 14 (M601). Upon receiving the user permission acquisition request M601, the HMI 14 displays a screen for confirming permission for update of the execution program D11. FIG. 11 illustrates a screen configuration example for acquiring a user permission. For example, a user permission is acquired by means of a touch panel or the like, and the result is responded to the gateway 12 (M602).

FIG. 8B illustrates a processing sequence after an update permission confirmation by the user is acquired in step S703. The sequence includes three steps of steps S704, S705, and S706. Each will be described below.

In the sequence diagram, step S704 illustrates the flow of the update processing a executed between the gateway 12 and the vehicle control device 11.

First, the gateway 12 transmits an update execution request command to the vehicle control device 11 (M811). This update execution request command includes, for example, information such as a flag indicating the update destination area. Here, the first area 1123 is specified. Upon receiving the update execution request command M811, the vehicle control device 11 executes update execution processing in step S804.

In the update execution processing S804, the new program is restored by difference restoration processing with the difference data stored in the second area 1124 in the difference data storage processing a S702 and the execution program D11 of the first area as inputs, and the execution program D11 of the first area is rewritten into the new program. When the rewriting of the program terminates normally, the update normal termination is returned to the gateway 12 (M812). The update execution processing S804 will be described later.

In the sequence diagram, step S705 illustrates the flow of the difference data storage processing b. This is processing of receiving from the gateway 12 the difference data D13', which could not be stored in the difference data storage processing a S702, and storing it in the second area 1124. Incidentally, the difference data D13 stored in the second area 1124 in the difference data storage processing a S702 may be erased because it has been used in the difference restoration in the update processing a S704. Accordingly, the difference data D13' received in the difference data storage processing b can also be stored in the second area 1124. The command sequence executed between the gateway 12 and the vehicle control device 11 is the same as the difference data storage processing a S702, and hence description thereof will be omitted.

In the sequence diagram, the final step S706 illustrates the flow of the update processing b. The new program is restored by the difference restoration processing with the difference data D13' stored in the second area 1124 in difference data storage processing b S705 and the current program of the first area as inputs, and the execution program D11 of the first area is rewritten into the new program. Here, the difference restoration processing is performed from the continuation of the program rewritten in the update processing a S704. This can be realized, for example, by the vehicle control device 11 storing the rewrite end position of the update processing a (restoration start position of the update processing b). The command sequence executed between the gateway 12 and the vehicle control device 11 is the same as the update processing a S704, and hence description thereof will be omitted.

Figure 12:
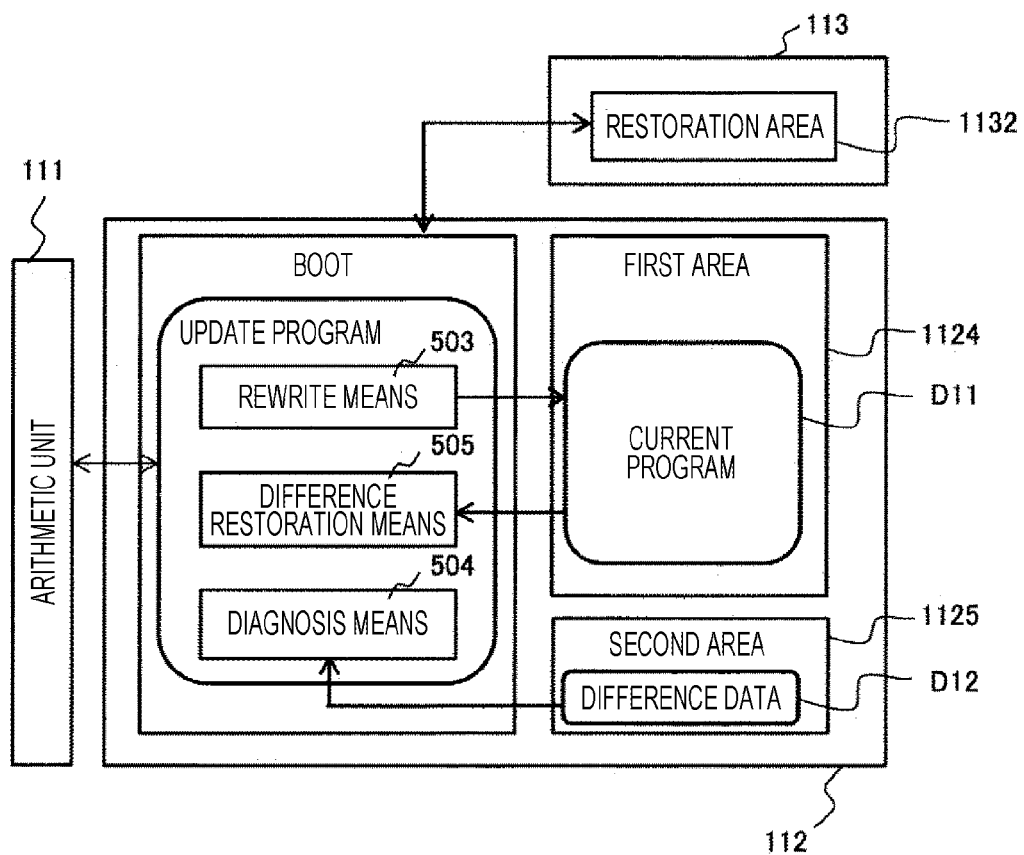
FIG. 12 is a difference update functional block diagram.
Figure 13:
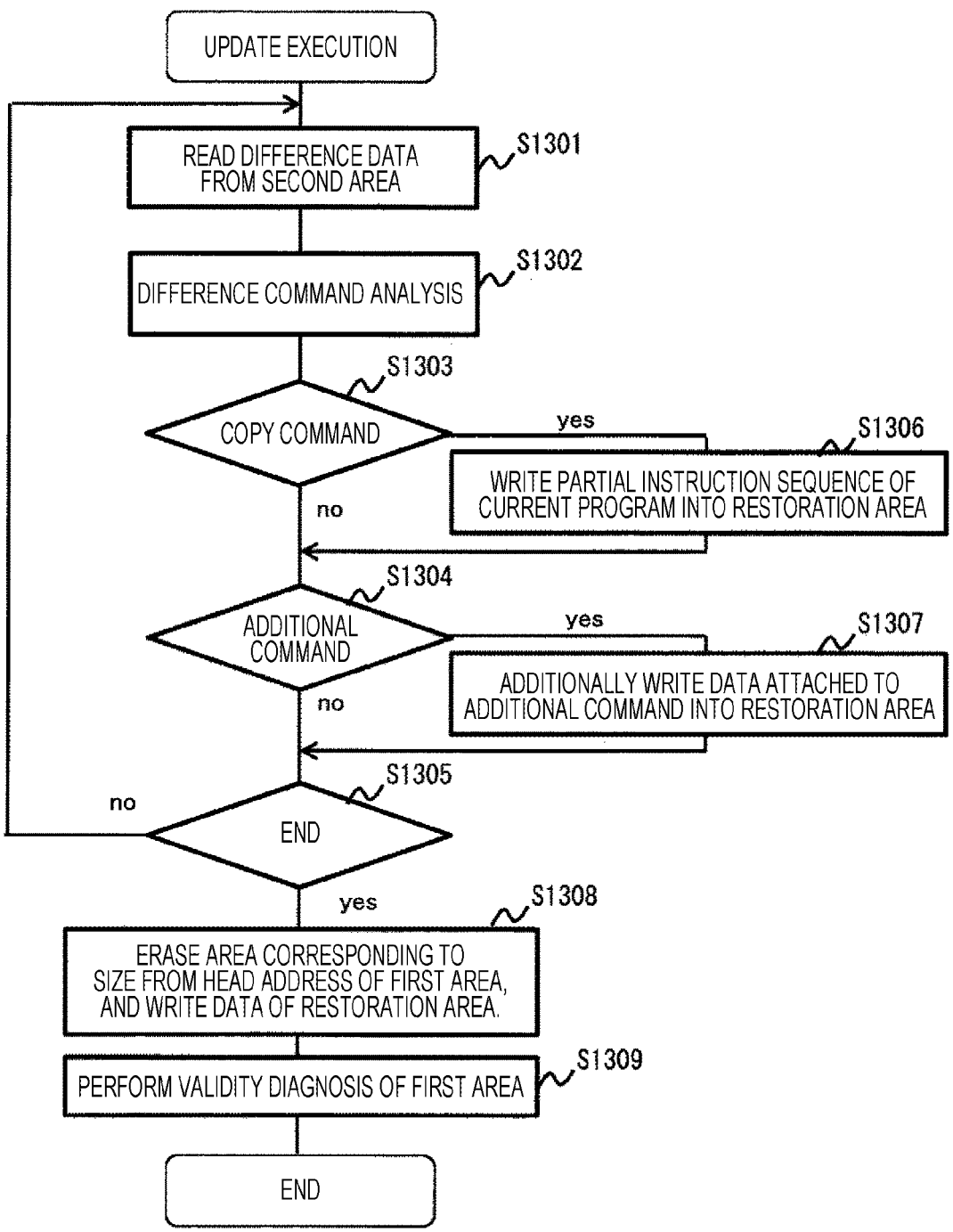
FIG. 13 is a flowchart of difference update processing.
Figure 14:
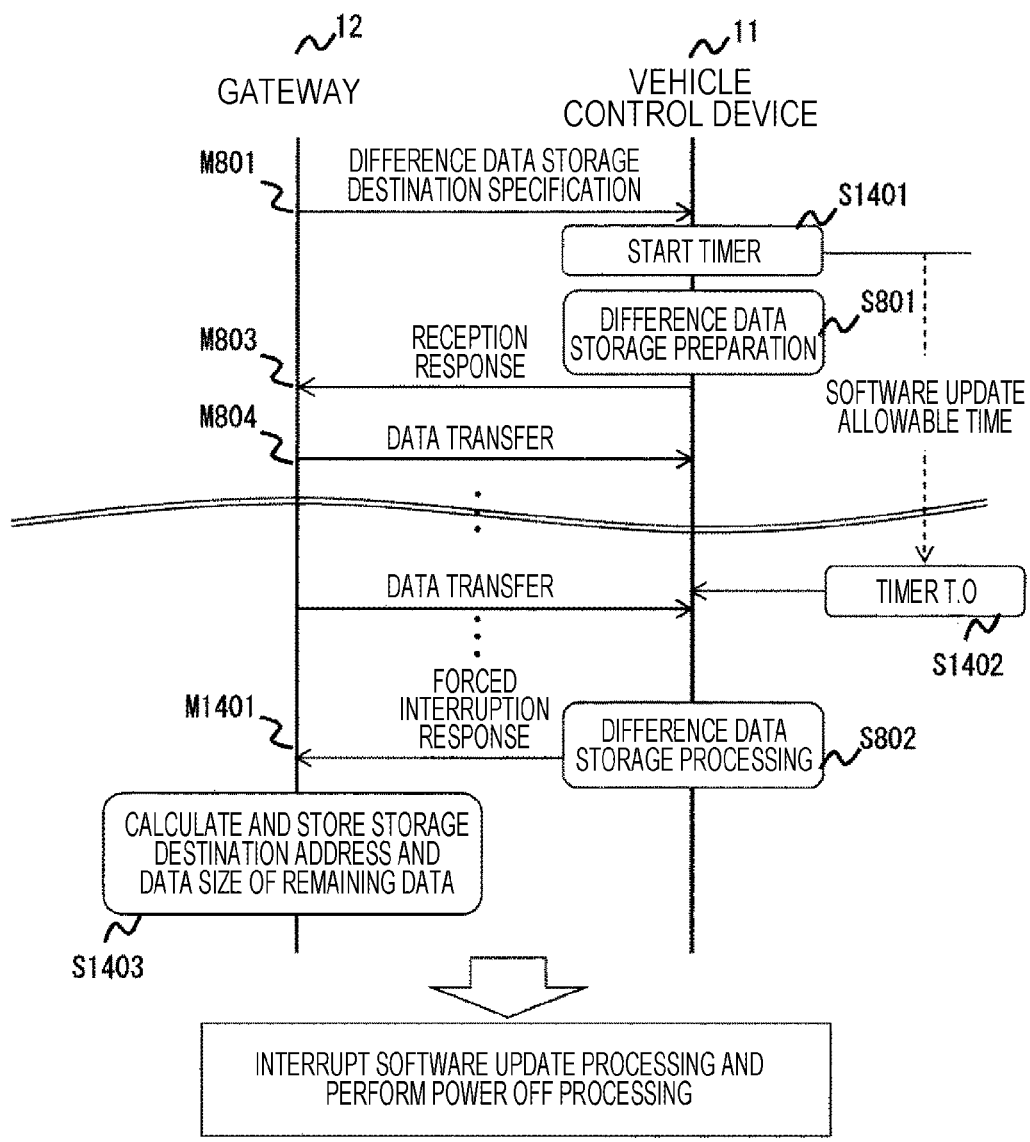
FIG. 14 is a sequence example with an update time limit.

Next, the operation of the update execution processing S804 will be described with reference to FIGS. 12 and 13. The update execution processing S804 is executed by the update program D10 when the vehicle control device 11 receives the update execution request M811 from the gateway 12.

First, a difference generation and difference restoration means will be described. In difference extraction processing or the like, the difference generation means searches and finds a partial instruction sequence similar to the partial instruction sequence of the new program from an old program, replaces the partial instruction sequence with a short code, and attaches it to a copy command. On the other hand, if a similar partial instruction sequence is not found, the partial instruction sequence is added to an additional command. The sequence of the copy command and the additional command is difference data. Thus, the difference data is not simply a result of subtracting the old program from the new program but is composed of sequences of a copy command, an additional command, and the like in which the similar partial instruction sequence is replaced with a short code.

In the light of the preparation described above, the operation of the update execution processing S804 by the difference will be described.

First, the difference restoration means 505 reads in step S1301 a difference command from the difference data D13 of the second area 1124. The difference command is analyzed in step S1302, it is determined in step S1303 whether the difference command is a copy command. If Yes, a partial instruction sequence of the execution program of the first area 1123 is written in a restoration area 1132 from an attached code in step 1306.

If No, it is determined in step S1304 whether the difference command is an additional command, and if Yes, data (partial instruction sequence) attached to the additional command is additionally written in the restoration area 1132 in step 1307. If No, it is determined in step 1305 whether all the difference data D13 of the second area 1124 have been read, and if No, the flow of processing returns to step 1301 and the processing is repeated. If Yes, the difference restoration processing terminates. Subsequently, the rewrite means 503 erases in step 1308 the area corresponding to the size from the head address of the first area 1123, and writes from a restoration buffer 1132 the new program whose difference has been restored to the same area. In step 1308, the validity diagnosis of the new program written in the first area 1123 is performed. Validity diagnosis methods include, for example, receiving a sum value or hash value of the entire new program from the gateway, calculating the sum value or the hash value of the new program restored by the vehicle control device itself, and checking whether the sum value or the hash value matches the received value. If this validity diagnosis successfully confirms that the new program is normal, the program update terminates. Thus, the new program whose difference is restored is successfully stored in the first area 1123.

The measures to be taken when the new program is determined to be abnormal in the validity diagnosis will be described in the second embodiment.

In the present embodiment, if the series of software updates take a long time, the conventional processing of the vehicle may be affected. In addition, the longer the software update time becomes, the longer the time until the power of the vehicle is turned off becomes, and if the ACC state continues for a long time, the battery consumption is increased accordingly, thereby causing the battery to be dead and in the worst case, creating a possibility of not capable of putting the vehicle in motion. As a means for solving such a problem, it is conceivable to provide a time limit on software update processing which can be performed at one time. If the software update processing is not finished within the time limit, the processing is suspended, and the update is performed from the continuation at the next execution timing.

This allows the above problem to be solved.

As an embodiment for solving the above problem, FIG. illustrates a sequence example in a case where the vehicle control device 11 is provided with a forced interruption function by a timer. Here, the difference data storage processing a S702 will be used for explanation. First, upon receiving the difference data storage destination specification command (M801) from the gateway 12, the vehicle control device 11 starts a timer (S1410). Thereafter, when the timeout of the limit time of the software update is notified during the processing of storing the difference data transmitted from the gateway 12 (S1402), the vehicle control device 11 transmits a forced interruption response M1401 to the gateway 12 and forcibly terminates the software update processing. Upon receiving the forced interruption response M1401, the gateway 12 calculates and stores (S1403) the address and data size of the write destination of the untransmitted difference data (remaining data), and forcibly terminates the software update processing. Thereafter, the vehicle shifts to power off processing. The gateway 12 calculates and stores up to which difference data to transmit and from which continued data to store, thereby allowing the difference data storage processing to be performed from the continuation at the next software update processing timing.

First Embodiment: Summary

As described above, when updating the program, by controlling the amount of data transmitted by the gateway according to the capacity of the area of the vehicle control device storing the difference data, the vehicle control device can sequentially restore and update the program by using the received partial data even if not all the difference data are stored. Therefore, it is possible to provide the vehicle control device that enables difference update even when a memory for receiving difference data cannot be sufficiently ensured, and as a result, it is possible to design a small memory area of the vehicle control device.

Second Embodiment

In the program update by the difference described in the first embodiment, the validity diagnosis processing for diagnosing whether the restored new program has been correctly restored and updated is described. As a problem in this case, if the diagnosis result is Abnormal, reprogramming by the difference becomes impossible because the old program does not already exist in the nonvolatile memory, and in the worst case, it is assumed that the vehicle becomes inoperable. Here, an example of a means for solving this problem while suppressing the memory area of the flash ROM of the vehicle control device 11 to be small will be described.

Figure 15:
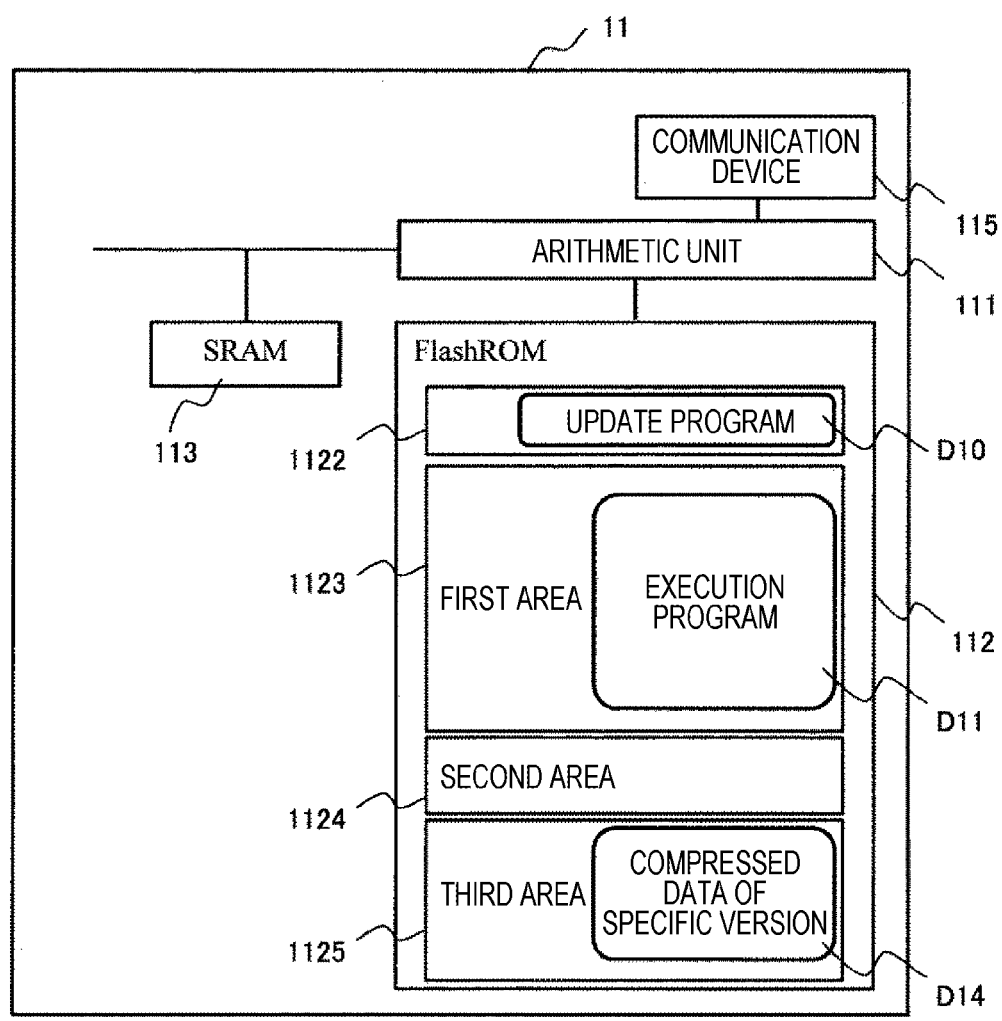
FIG. 15 is a functional block diagram of the vehicle control device according to a second embodiment of the present invention.

FIG. 15 is a configuration diagram of the vehicle control device 11 according to the second embodiment of the present invention.

It is basically the same as the configuration diagram of the vehicle control device 11 of the first embodiment, but in the second embodiment, the flash ROM 112 is provided with a third area 1125, and a specific program (e.g., emergency program) D14 is arranged in a compressed state (compressed data).

Figure 16:
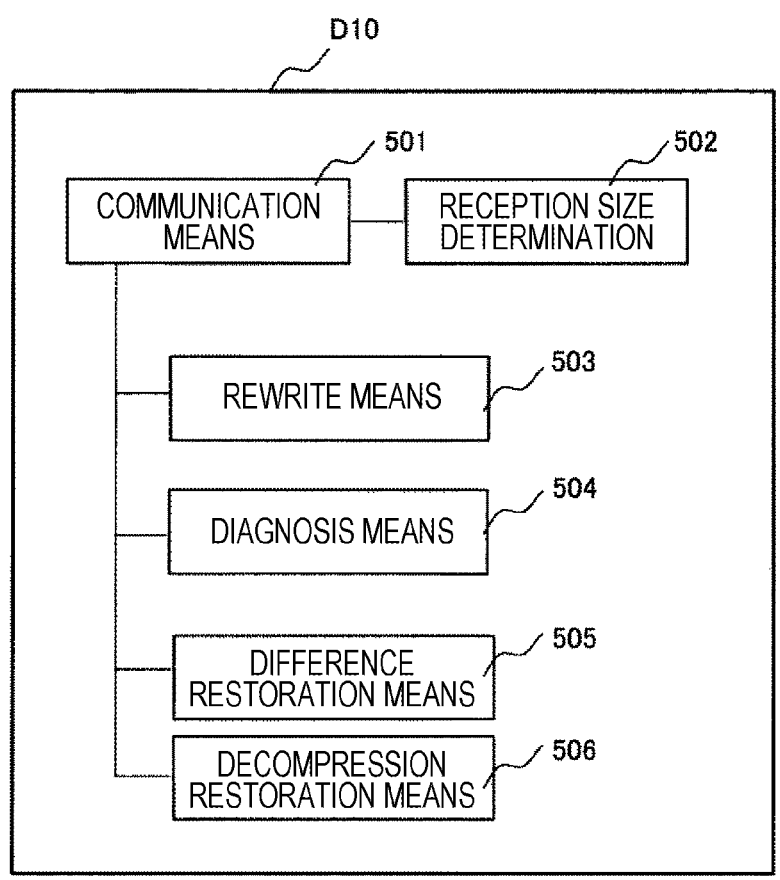
FIG. 16 is a functional block diagram of the vehicle control device according to the second embodiment of the present invention.

FIG. 16 is a diagram illustrating the functional configuration of the update program D10 according to the second embodiment of the present invention.

A decompression means 506 is provided as a means for decompressing the compressed data D14 described above.

The difference is restored by the difference restoration means 505 using the execution program D11 of the first area 1123 and the difference data stored in the second area 1124 as inputs, and the execution program D11 of the first area 1123 is rewritten by the restored new program. Thereafter, if the diagnosis result by the validity diagnosis is Abnormal, the compressed data D14 of the emergency program arranged in the third area 1125 is decompressed by the decompression restoration means 506 and written in the first area 1123.

By operating this specific program, the vehicle control device 11 can be made operable.

Second Embodiment: Summary

As described above, the flash ROM 112 is provided with the third area 1125, the specific program (e.g., emergency program) D14 is arranged in a compressed state (compressed data), and when a difference update abnormality occurs, the program is decompressed, whereby the vehicle can be put into an operable state. In addition, the specific program can be made smaller in program size because it can be limited to the emergency functions necessary to put the vehicle in motion. Accordingly, the compressed data has a further smaller size, and as a result, the capacity of the backup nonvolatile memory can be reduced.

<Modifications>

The present invention is not limited to the above embodiments, and includes various modifications. For example, the embodiments described above have been described in detail in order to explain the present invention in an easy-to-understand manner, and are not necessarily limited to those including all the described configurations. It is possible to replace part of the configuration of one embodiment with the configuration of another embodiment, and it is also possible to add the configuration of another embodiment to the configuration of one embodiment. In addition, another configuration can be added to, deleted from, or replaced with part of the configuration of each embodiment.

In the first embodiment, the flash ROM 112 is described as an example of the area for storing the control program, but another nonvolatile storage device may be used.

In the first embodiment, a configuration example in which the flash ROM 112 is divided into the first area 1123 and the second area 1124 is described, but the same configuration can be realized by two storage devices.

The HMI 14 is a liquid crystal display device for various displays embedded in the center of the dashboard. However, it may be a voice recognition device or another means such as a smart phone that allows user permission confirmation.

In the update sequence, the latest version of the control program is usually written, but depending on various circumstances, there is a possibility that update is performed using a downgraded control program. In this case, the updated version of the control program is the downgraded control program. That is, the updated version of the control program refers to the control program written by the latest update sequence.

Each of the above-described configurations, functions, processing units, processing means, and the like may be partially implemented by hardware by, for example, designing them in an integrated circuit. Furthermore, each of the above-described configurations, functions, and the like may be implemented by software by the processor interpreting and executing a program that implements each of the functions. Information such as programs, tables, and files for implementing each function can be stored in a recording device such as a memory, a hard disk, or a solid state drive (SSD) or a recording medium such as an IC card, an SD card, or a DVD.

According to each of the above embodiments and combinations of the embodiments, the difference data of the size corresponding to the memory capacity of the vehicle control device is downloaded, and update based on the difference is performed. By repeating this operation, all updates of the control program are realized even when the difference data is large. That is, the difference update can be realized even if the memory for storing the difference data is small, and as a result, the capacity of the difference data storage area (second memory unit) of the vehicle control device can be designed to be small, and the effect of cost reduction can be obtained.

REFERENCE SIGNS LIST 1 vehicle
2 server
3 internet line
4 wireless base station
5 update package
11 vehicle control device
1122 boot block
1123 first area
1124 second area
1125 third area
12 gateway
13 in-vehicle network
14 HMI
d10 update program
d11 execution program
d13 difference data
d14 compressed data of specific version

The invention claimed is:

1. A vehicle control device, comprising:
a first memory configured to store a rewritable program;
a second memory configured to store difference data between the rewritable program and a new program;
a reception circuit configured to receive the difference data divided for each write block unit length of the second memory, an address of a write destination of the new program, and data including a size of the difference data;
a determination circuit configured to determine a size of the difference data having been received;
a write circuit configured to write the difference data having been received to the address of the second memory;
a difference restoration circuit configured to restore the new program from the difference data stored in the second memory and the rewritable program;
a rewrite circuit configured to rewrite the rewritable program in the first memory to the new program having been restored,
wherein when the determination circuit determines that the difference data of a write block size of the second memory is received, the write circuit is configured to write received difference data in the address of the second memory,
wherein transmission of the difference data is awaited when the difference data of a memory size of the second memory is received and it is determined that the difference data has not been received; and
wherein the vehicle control device further includes a diagnosis circuit configured to diagnose the difference data written in the second memory, wherein when the difference data stored in the second memory is normal and a program update is permitted from a user,
wherein the difference restoration circuit is configured to restore a difference by the difference data stored in the second memory unit and the rewritable program stored in the first memory, and
wherein the rewrite circuit is configured to rewrite the rewritable program in the first memory to the new program,
wherein when the difference data has not been received, remaining difference data is received after rewrite to the restored program, and
the remaining difference data received is written in the second memory, and
when the diagnosis of the difference data having been written is normal,
a difference is restored by the difference restoration circuit from the difference data stored in the second memory and the rewritable program stored in the first memory, and
the program in the first memory is rewritten to the new program.

2. The vehicle control device according to claim 1, further comprising:
a timer, wherein
when the timer has detected that a predetermined period of time has elapsed during reception of the difference data,
the reception of the difference data is stopped.

3. The vehicle control device according to claim 1, wherein rewrite of the program in the first memory to the new program is performed when an ignition is off and a shift gear of a vehicle is at a parking position.

4. A program update system, comprising:
a vehicle control device;
a program write device connected with the vehicle control device via an in-vehicle network;
a server configured to distribute an update package including difference data of the vehicle control device to the program write device via wireless communication; and
an input-output device configured to control input and output with a user, wherein
the vehicle control device includes:
a first memory configured to store a rewritable program,
a second memory configured to store difference data between the rewritable program and a new program,
a reception configured to receive the difference data divided for each write block unit length of the second memory, an address of a write destination of the new program, and data including a size of the difference data,
a determination circuit configured to determine a size of the difference data having been received,
a write circuit configured to write the difference data received to the address of the second memory,
a difference restoration circuit configured to restore the new program from the difference data stored in the second memory and the rewritable program, and
a rewrite circuit configured to rewrite the rewritable program in the first memory to the new program having been restored,
wherein when the determination circuit determines that the difference data of a write block size of the second memory is received, the write circuit is configured to write received difference data in the address of the second memory, wherein when the program write device receives a notification from the vehicle control device, during transmission of the difference data, such that transmission of the difference data is suspended, the program write device stores a head part of the difference data which has not been transmitted, stops transmission of the difference data, and transmits a request for validity diagnosis to the vehicle control device, wherein the program write device is configured to perform conformation as to whether or not a program update of the vehicle control device is possible by the input-output device when a result of the validity diagnosis of the difference data from the vehicle control device is normal, wherein the program write device is configured to transmit a program update execution request including a write destination address of the new program and a size of the difference data to the vehicle control device when a result of the confirmation is possible, wherein when the program write device receives a response to the program update execution request from the vehicle control device, the program write device transmits the difference data from the head part to the vehicle control device when the program write device has the difference data not being transmitted.

5. The software update system according to claim 4, wherein when the program write device receives a notification from the vehicle control device, during transmission of the difference data, such that a program update procedure is suspended due to elapse of a predetermined period of time, the program write device stores a head part of the difference data which has not been transmitted and the difference data size having not been transmitted, and terminates program update processing.

6. A vehicle control device, comprising:

a first memory configured to store a rewritable program;

a second memory configured to store difference data between the rewritable program and a new program;

a third memory configured to store a compressed specific program;

a reception circuit configured to receive the difference data divided for each write block unit length of the second memory, an address of a write destination of the new program, and data including a size of the difference data;

a determining circuit configured to determine a size of the difference data having been received;

a write circuit configured to write the difference data received to the address of the second memory;

a difference restoration unit circuit configured to restore the new program from the difference data stored in the second memory and the rewritable program;

a rewrite circuit configured to rewrite the rewritable program in the first memory to the new program;

a decompression restoration circuit configured to decompress and restore the compressed specific program and rewrite the rewritable program to the specific program, wherein when the determination circuit determines that the difference data of a write block size of the second memory is received, the write circuit is configured to write received difference data in the address of the second memory; and a diagnosis circuit configured to diagnose the new program having been restored, wherein the decompression restoration circuit configured to decompress and restore the specific program stored in the third memory in accordance with a result of the diagnosis, and rewrite the rewritable program in the first memory to the specific program.

\* \* \* \* \*